United States Patent [19]

Schnittger

[11] Patent Number: 4,583,870
[45] Date of Patent: Apr. 22, 1986

[54] HYDRODYNAMIC BEARING UNIT

[76] Inventor: Jan R. Schnittger, Vinterbrinksägen 43, S-133 00 Saltsjöbaden, Sweden

[21] Appl. No.: 654,826

[22] Filed: Sep. 26, 1984

[30] Foreign Application Priority Data

Sep. 29, 1983 [SE] Sweden .................... 8305332

[51] Int. Cl.⁴ ................ F16C 17/16; F16C 32/06
[52] U.S. Cl. .................... 384/114; 384/121
[58] Field of Search ......... 368/5 R, 3.5, 4 R, DIG. 3, 368/DIG. 15; 384/100, 397, 114, 118, 99, 115, 121, 119, 107, 108, 297, 369, 287

[56] References Cited

U.S. PATENT DOCUMENTS

| | | | |
|---|---|---|---|
| 1,794,623 | 3/1931 | Jones | 384/287 |
| 1,999,266 | 4/1935 | Warlop | 384/292 |
| 3,669,517 | 8/1970 | Hughes | 384/115 |
| 3,764,186 | 10/1973 | Laing et al. | 384/108 |
| 4,141,603 | 2/1979 | Remmers et al. | 384/108 |

FOREIGN PATENT DOCUMENTS

| | | |
|---|---|---|
| 2742516 | 3/1979 | Fed. Rep. of Germany . |
| 3112746 | 10/1982 | Fed. Rep. of Germany . |
| 40842 | 9/1932 | France . |
| 416577 | 1/1981 | Sweden . |

*Primary Examiner*—Stuart S. Levy
*Assistant Examiner*—Lynn M. Sohacki
*Attorney, Agent, or Firm*—Beveridge, DeGrandi and Weilacher

[57] ABSTRACT

A hydrodynamic slide bearing unit has two relatively movable surfaces between which there is built up in a lubricant layer at least one load-bearing pressure zone within which the pressure (p) during one revolution in the direction of movement will increase from an initial pressure ($p_o$) at the forward portion of the pressure zone to a higher pressure ($p_m$) around the most central part of the pressure zone and decrease again to the initial pressure ($p_o$), the slide bearing having at least one feed opening for lubricant at or ahead of that portion of the pressure zone which is foremost as counted in the direction of movement or flow, and an outtake means for collection of lubricant with a pressure higher than the initial pressure ($p_o$), the lubricant being fed back via a return means to the lubricant layer through a feed opening, whereby the pressure difference will produce a pump effect for circulation of lubricant through the lubricant layer. According to the invention the outtake means comprises long, pressure-relieving openings situated downstream of the feed opening on the sides of the pressure zone and generally extending in the direction of movement, in order to relieve those portions of the bearing surfaces which are situated outside the relief openings from the higher pressure ($p_m$) prevailing in the hydrodynamic bearing and thus eliminate the leakage flow perpendicular to the flow direction and return it to the feed opening.

18 Claims, 11 Drawing Figures

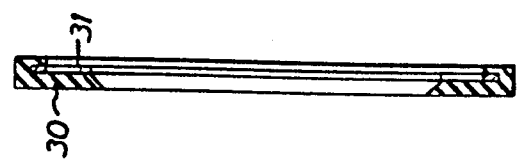
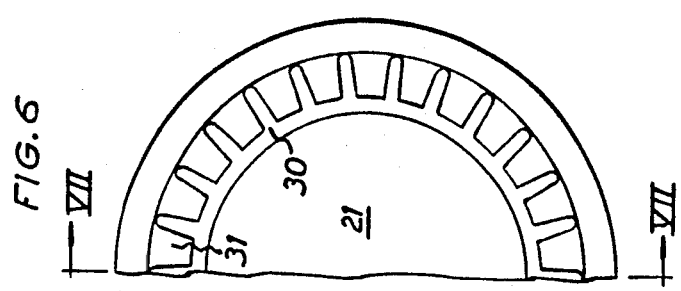
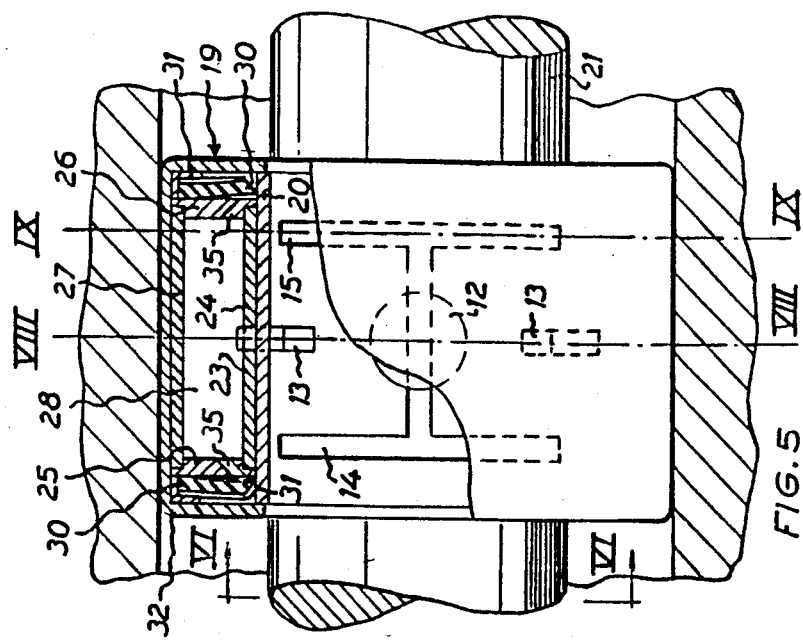

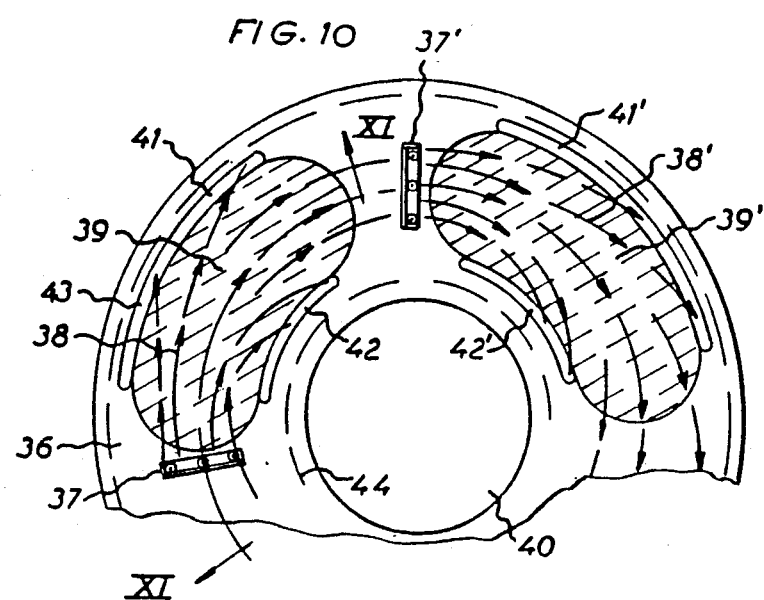
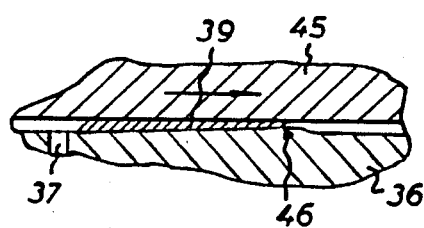

HYDRODYNAMIC BEARING UNIT

SUMMARY OF THE INVENTION

The present invention relates to hydrodynamic slide bearing units of radial type as well as axial type, which are adapted for self-circulation of the lubricant.

Hydrodynamic radial slide bearings are wellknown, working with so much lubricant between shaft and bearing cup that the lubricant will build up a thin, supporting film with important overpressure within the loaded pressure zone. It is also known to use this fact to obtain a pump effect bringing the lubricant in circulation around the bearing through a channel situated outside the "tribologic" surfaces.

These prior art bearings have a lubricant reservoir situated outside the bearing, and the bearing construction must thus be built up of several units, if desired including connecting channels in the form of tubes or hoses. Certain constructions also require a cooler and a pump for the lubricant, respectively cooling and feeding lubricant up to the bearing surfaces. Such constructions are known from e.g. Patent Specifications U.S. No. 1,999,266, S.E. No. 76,014,406 and F.R. No. 40,842. However, these constructions have not found any wide practical use but constitute complicated and unpractical constructions.

Conventional hydrodynamic slide bearings give practically no bearing wear at all, if they are carefully constructed, and are used in the technique for a large number of different cases of service making great demands upon reliability, lifetime, capacity of resisting vibrations and heat, as well as in such machines where silent running is desired.

In spite of the many advantages with a hydrodynamic bearing construction there are certain disadvantages, however, such as the building together of a number of separate bearing parts, depending on outer circulation systems with pumps, coolers, etc, which may entail high costs for installation and maintenance. It is also necessary to work the rotary shaft or the supporting axial disc so as to obtain a surface smoothness corresponding to the demands of the hydrodynamic lubrication, i.e. a few micrometers. This may involve great difficulties, for instance when it comes to working of shafts with rotors for large turbines, generators, etc. This also applies to the renovation of worn-out supporting shaft or support surfaces.

The object of the present invention is to retain all the good properties of conventional hydrodynamic slide bearings and to achieve new advantages while eliminating the above-mentioned disadvantages.

With this invention a hydrodynamic, closed slide bearing with self-circulation and a lubricant reservoir integrated in the bearing has been obtained for the first time, which slide bearing is a complete and separate machine element with the same possibilities of being built into bearing constructions as for roll bearings. As the construction of the bearing is provided with e.g. light bearing races, which are easy to manufacture with good surface fineness, favourable conditions have also been created for inexpensive mass production based on simple materials such as tube blanks or pressed sheet metal.

An important advantage with the inventive bearing and its function is that an efficient sealing means has been obtained to prevent lubricant leakage from the reservoir and thus from the bearing unit. This applies statically during standstill and during laying up units on bearings as well as dynamically during operation. The seal has small friction and thus low temperature rise in the bearing. The leakage through the seal from the supporting lubricant film of the bearing is most insignificant and has been reduced to such a level that the bearing will retain its entire functionability also after long service time.

The described advantages have been obtained in a hydraulic slide bearing unit having two relatively movable surfaces between which there is built up in a lubricant layer at least one load-supporting pressure zone within which the pressure during one revolution in the direction of movement will increase from an initial pressure at the frontal portion of the pressure zone to a higher pressure around the most central part of the pressure zone and decrease again to the initial pressure, said slide bearing having at least one feed opening for lubricant at or ahead of the portion of the pressure zone which is foremost as counted in the direction of movement or flow and an outtake means for collection of lubricant at a pressure higher than the initial pressure, said lubricant being fed back via a return means to the lubricant layer through a feed opening, whereby the pressure difference produces a pump effect for circulation of lubricant through the lubricant layer in that the outtake means comprises long pressure relief openings situated downstream of the feed opening on the sides of the pressure zone and generally extending in the direction of movement, in order to relieve those portions of the bearing surfaces which are situated outside the relief openings from the higher pressure prevailing in the hydrodynamic bearing and thus eliminate the leakage flow perpendicular to the flow direction and return it to the feed opening.

In a second embodiment of the invention, sealing means cooperating with the pressure relieved portions of the bearing surfaces are arranged between the stationary and mobile parts of the bearing unit, which sealing means prevent the lubricant from penetrating out of the bearing unit.

In a third embodiment the bearing unit consists of a radial bearing with relief openings extending along part of the periphery of the cylinder surface of a bearing cup, which surface is coaxial with the axis of rotation, said sealing means consisting of sealing rings arranged outside each relief opening.

A fourth embodiment for the rotary bearing of a shaft or journal relative to a bearing seat includes an outer annular housing adapted to be mounted in a bearing seat and having a first, inwardly turned circular-cylindrical bearing race, an inner annular shaft sleeve to receive the shaft or journal and with an outwardly turned circular-cylindrical second bearing race adapted to coact with the first bearing race as a hydrodynamic bearing during the relative rotation of the bearing races, annular sealing elements situated at both ends of the hydrodynamic bearing for rotary sealing between the outer housing and the inner shaft sleeve, and a closed annular oil compartment connected with spaces immediately inside the sealing elements.

A fifth embodiment has at least one communication between the oil compartment and a feed opening arranged in the stationary bearing race on the unloaded side of the hydrodymanic bearing.

In a sixth embodiment the pressure relief openings consist of pressure relief grooves situated at some distance inside the sealing elements in the stationary bearing race on the loaded side of the race, preferably with an angle between 90° and 180° along the circumference of the race, said grooves being connected with the oil compartment.

A seventh embodiment includes an opening situated diametrically opposite the pressure relief grooves for supply of oil from the oil compartment to the lubricant layer.

In an eighth embodiment the oil compartment is arranged in the outer housing and defined by two concentric tubes and two annular plane side discs which have communication channels with a chamber between the side discs and sealing rings arranged outside said discs and lying in sealing contact with the inner shaft sleeve shaped as a tube.

In a nineth embodiment the bearing is an axial bearing including two surfaces wich are relatively moveable in a plane perpendicular to the axis of rotation and have at least two lubricant layers converging in the direction of movement and thus at least two bearing pressure zones being part of an annular, plane race, with radially directed feed openings, while relief openings are arranged as part of a circular path repectively outside and inside the pressure zones, and the sealing means consist of annular cylindrical axial seals arranged at the annular pressure-relieved bearing portions respectively outside and inside the relief openings.

The invention will now be described more fully with reference to the accompanying drawings in which:

FIG. 5 is a horizontal section on line V—V in FIG. 2 of a bearing according to the invention through the axis of the bearing;

FIG. 6 shows the right-hand half of the bearing unit as seen in the direction indicated by VI in FIG. 5;

FIG. 7 is a section through the sealing means of the bearing on line VII—VII in FIG. 6;

FIG. 10 shows one bearing race, as seen in the load direction, in an axial slide bearing; and FIG. 11 is a section on line XI—XI in FIG. 10.

Figure 1:
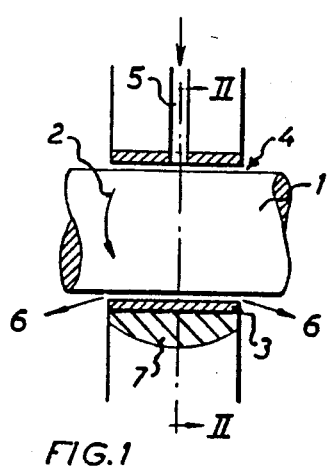
FIG. 1 is a longitudinal section of a conventional hydrodynamic slide bearing through the axis thereof.

In FIG. 1 the rotary shaft supported by the bearing and rotating in the direction of the arrow 2 is designated by 1. The stationary bearing race is designated by 3, and 4 is a supporting lubricant film. The lubricant is supplied to the bearing through a channel 5 and the arrows 6 indicate the leakage of lubricant from the bearing. The pressure distribution in the section in the axial direction of the bearing is indicated by the hatched surface 7.

Figure 2:
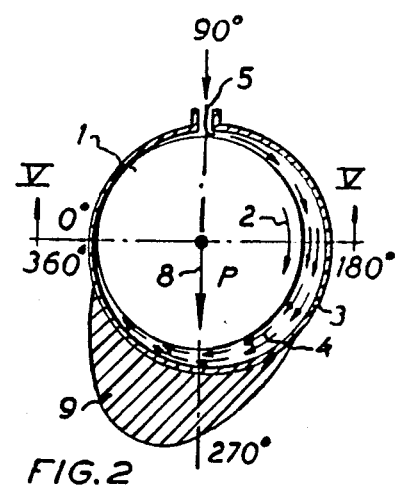
FIG. 2 is a section through the bearing on line II—II in FIG. 1.

In FIG. 2, numerals 1-5 designate the same parts as in FIG. 1. The arrow 8 indicates the load carried by the bearing and the hatched surface 9 indicates the pressure distribution in the supporting lubricant film 4 in the direction of rotation of the axis.

Figure 3:
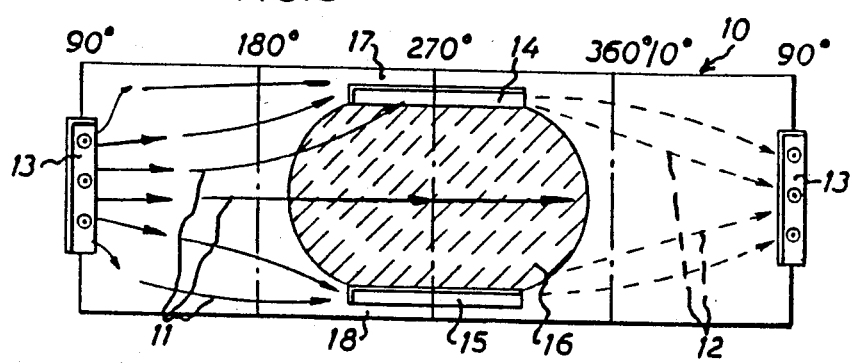
FIG. 3 is a spread view of the bearing race along the circumference of a bearing according to the invention.

FIG. 3 is a spread view of a stationary race 10 according to the invention for a radial bearing and surrounding the rotary component. i.e. a shaft provided with a sleeve, in a hydrodynamic bearing. The flow paths for the circulating lubricant flow have been drawn in the figure and the lubricant flow streaming up to the supporting lubricant film between the bearing and the shaft has been indicated by full lines 11 and the flow from the return lubricant flowing from the supporting film outside the stationary race 10 is indicated by broken lines 12. The full lines 11 thus indicate the flow of the lubricant in the bearing proper while the broken lines 12 indicate the leakage or outlet flow in outer return channels. Angular positions from 0° to 360° along the bearing cup have been indicated in the same manner as in FIG. 2, 90° indicating the position in which the lubricant is supplied and 270° the direction in which the load 8 acts on the bearing.

FIG. 3 shows the feed opening 13 for lubricant up to the bearing lubricant film the pressure zone of which has been designated by 16 and marked with dashed hatching. Two pressure relief openings 14 and 15 extend generally in the main direction of the flow. In the case shown the openings 14, 15 extend along part of the circumference of the stationary race 10 at the axial ends of the bearing for leading away and returning lubricant under pressure from the supporting lubricant film to the lubricant reservoir of the bearing. In this way those portions 17, 18 of the stationary race 10 which are situated outside the openings will not be exposed to pressure.

Figure 4:
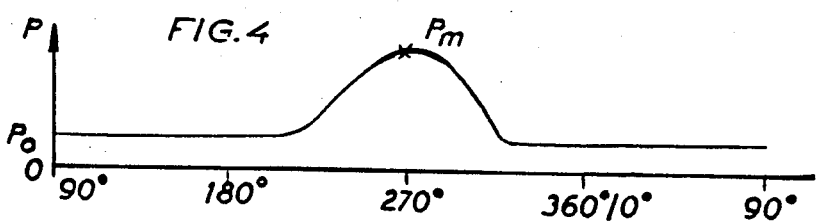
FIG. 4 shows the pressure distribution along the center line for the periphery of the bearing race in FIG. 3.

FIG. 4 shows the pressure in the center of the race as a function of the angle along the circumference. As is apparent from the figure a certain low pressure $p_o$ in the lubricant film prevails in the range from 90° and an angle thereafter—up to ca 180°—as well as at an angle between ca 360° and up to 90°, which depends on a rest flow of lubricant in the film. From the figure it appears that the initial pressure $p_o$ in the center of the supporting film increases to a maximum value $p_m$ around the angular position 270° and then it decreases again towards $p_o$ at the feed opening 13.

The maximum pressure $p_m$ of the supporting lubricant film in the pressure zone 16 thus lies around the angular position 270°. The major part of the lubricant is led out into a return channel through the openings 14 and 15 and only a very insignificant axial leakage remains to return in another way to the lubricant reservoir. The residual flow following the rotary race throughout the entire revolution of rotation is favourable for the lubrication of the bearing. This residual flow continues to the feed opening at the angular position 90° where also the return channels for the flow on the outside of the race 10—the dashed flows 12—open for feeding of circulating lubricant through the opening 13 to the supporting layer film.

FIG. 5 shows a section through an embodiment of a bearing unit according to the invention. The rotary race consists of a shaft sleeve 20 which is mounted with slide fit on the rotary shaft 21 the load of which is to be supported. The stationary race 20 is provided on the inner surface of a cylindrical tubular bearing cup 24. This is built together with side discs 25, 26 and a tubular piece 27. The parts 24, 25, 26 and 27 form a torus-shaped chamber 28 which functions both as return channel and as a lubricant reservoir.

The pressure in the lubricant film in the slide surface between the rotary shaft sleeve 20 and the stationary bearing cup 24 generates, in spite of the relief openings 14, 15, a certain axial leak flow which would leak out from the bearing unit if the outflow was not prevented by some form of seal.

In the embodiment shown two rubber ring seals 30 have therefore been placed immediately outside the side discs 25 and 26. The rubber ring seals 30 are pressed lightly against the rotary shaft sleeve 20 by means of annular, inwardly dented steel ring springs 31 which are made in one piece with the rubber seal ring 30, as will appear in more detail from FIGS. 6 and 7.

All the mentioned elements 24–27 and 30–31 are enclosed in an outer housing with a cylindrical outer surface and ring shaped end walls which are extended radially inwards so far that they will prevent the shaft sleeve 20 from sliding out of the bearing unit in axial direction. There is thus formed a complete prefabricated hydrodynamic slide bearing unit consisting of a bearing sleeve 20 and an outer housing 19 composed of the elements 24–27 and 30–32 and containing an oil reservoir in the form of an annular oil compartment 28. The circulation of lubricant is controlled by the elements and details illustrated in FIGS. 8 and 9.

Figure 8:
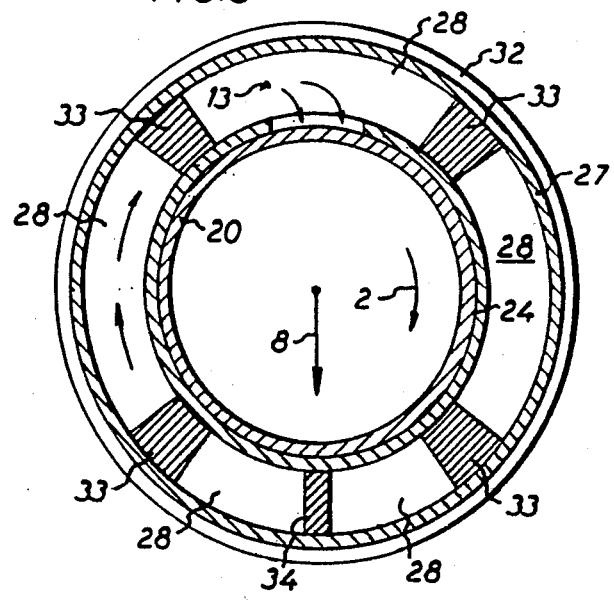
FIG. 8 is section on line VIII—VIII in FIG. 5.

FIG. 8, which represents a section through the center of the bearing unit, shows, on one hand, how the bearing cup 24 is centered by means of four supports 33 exactly also in the most central portion of the bearing while the side discs 25 and 26 have this function with respect to the end portions of the bearing cup 24. The figure also shows how a baffle wall 34 divides the return channel, e.g. the torus-shaped chamber 28, into two halves of 180° on either side of the plane through the loading direction 8 and how the supply opening 13 is arranged with 180° displacement in relation to the baffle wall 34.

The arrangement will thus cause that the return channel 28 between the elements 24, 25, 26 and 27 will be divided into two compartments, each in the form of a half torus, viz a left-hand and a right-hand part according to FIG. 8. Thus the circulation in the return channel 28 can take place either via one side half or the other side half of the channel, i.e. on one side or the other of the plane through the loading direction 8 of the bearing.

Figure 9:
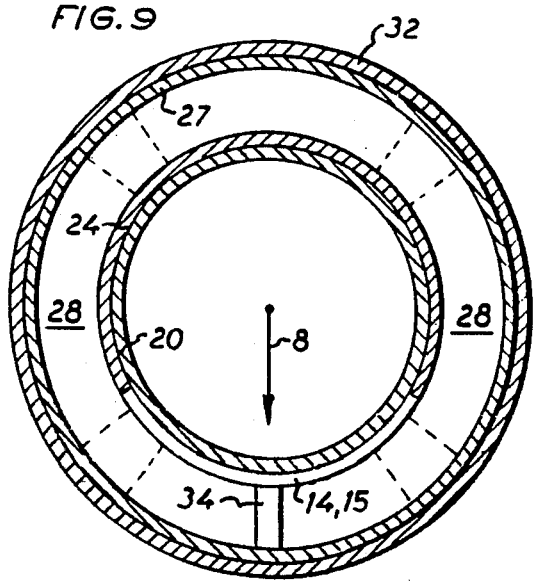
FIG. 9 is a section on line IX—IX in FIG. 5.

FIG. 9 shows position and dimensioning of the relief openings 14 and 15. As these openings are situated at the pressure zone lubricant will pass through the openings and out into the return channel 28 during operation. In the embodiment according to this figure the openings have a symmetric extent around the loading plane 8 in spite of the fact that a loading according to FIG. 8 would lead to a slightly asymmetric pressure distribution and a preference for the formation of a corresponding asymmetric flow pattern.

When the direction of rotation is constant a modified shape and another position of the openings 14 and 15 may be more favourable with respect to the pressure distribution in the supporting hydrodynamic lubricant film. The construction shown and described above relates to a radial bearing which functions equally well in both directions of rotation of the bearing. Also the positioning of the side wall 34 is dependent on this symmetry and a modification of the position of this wall is to be preferred if the bearing is to be optimized for only one direction of rotation.

In spite of the pressure relief openings 14, 15 a certain minor axial side leakage will arise, especially at the pressure zone 16. During operation the shaft sleeve 20 will thus rotate and exert a certain centrifugal action upon the lubricant which may leak out into the space between the side discs 25 and 26 and the rubber ring seals 30. The lubricant will therefore have a certain natural flow movement in radial direction and will thereby be forced to return via the channels 14, 15, 28 to the feed opening 13.

The bearing described is a radial bearing for receiving load at right angles to the axis of rotation. The rotary bearing surface consists of a shaft sleeve 20 the outer surface of which is finely processed to serve as a bearing surface. One may also let the relatively rotating parts of the bearing unit change place, i.e. so that the rotary part consists of a sleeve enclosing the reservoir 28, while the inner surface of the sleeve is worked so as to constitute a bearing surface.

The invention may also be applied to hydrodynamic axial bearings where the rotary bearing surface consists of a supporting circular disc while the stationary reservoir part has a bearing surface with a saw-tooth shaped surface in the direction of rotation with relief openings at the radially inner and outer portions of the closed bearing unit. The various embodiments described above in connection with the description of a radial bearing may also be applied to an axial bearing with the modification caused by the fact that the race in first case is cylindrical and in the latter case ring-shaped.

FIG. 10 thus shows the stationary bearing surface 36 of an axial bearing. The lubricant is introduced through inlet openings 37 and 37' which are generally radially directed. From there the lubricant is led with the flow 38, 38' by means of the rotary race into the pressure zones 39 and 39' respectively. The pressure zones are defined along their outer part by pressure relief openings 41 and 41' respectively and at their inner part of corresponding pressure relief openings 42, 42'. From the pressure relief openings the lubricant is carried, in a manner similar to that described above, to the following inlet opening, for instance to the opening 37' from the openings 41, 42. Outside the outer pressure relief openings 41, 41' there is a annular surface against which a circular-cylindrical sealing means, indicated by numeral 43, makes a seal between the relatively movable parts of the bearing unit so that no or only insignificant leakage will occur from the bearing unit.

In the same way a corresponding sealing means, indicated with the broken line 44, is arranged inside the inner pressure relief openings 42, 42'.

In the center of the bearing unit there is an opening 40 adapted to receive the shaft the axial load of which is transferred to the rotary bearing part (not shown) which thus is supported by the annular lubricant film.

FIG. 11 shows a section along a cylinder surface situated centrally in the ring-shaped bearing surface. This figure shows the bearing part 45 rotating with the shaft and receiving the axial load. The stationary race 36 is shown in the lower part of the figure as well the inlet opening 37 and the lubricant film in the pressure zone 39. The figure also shows the wedgeshaped portion 46 of the race 36 which effects the pressure rise in the pressure zone during the rotation of the parts.

It is obvious that other embodiments than the two hydrodynamic bearing units described by way of example may be made by anyone skilled in the art within the scope of the appended claims.

What I claim and desire to secure by Letters Patent is:

1. Hydrodynamic slide bearing unit having two relatively movable surfaces between which there is built up a lubricant layer, at least one load-bearing pressure zone within which the pressure during one revolution in the direction of movement will increase from an initial pressure at the frontal portion of the pressure zone to a higher pressure around the most central part of the pressure zone and decrease again to the initial pressure, said slide bearing having at least one feed opening for lubricant at or ahead of that portion of the pressure zone which is foremost in the direction of movement or flow, an outtake means for collection of lubricant at a pressure higher than the initial pressure, said lubricant being fed back via a return means to the lubricant layer through a feed opening, where the pressure difference will produce a pump effect for circulation of lubricant through the lubricant layer, wherein the outtake means comprises pressure relief openings situated downstream of the feed opening said pressure openings being elongated, and oriented so that their dimensions in the direction of movement are substantially greater than their dimensions which are transverse to the direction of movement, said elongated pressure relief openings being located on opposite sides of the pressure zone in order to relieve those portions of the bearing surfaces which are situated laterally outside the relief openings from the higher pressure prevailing in the hydrodynamic bearing and to eliminate the leakage flow perpendicular to the flow direction, whereby the lubricant is returned to the feed opening rather than being lost by transverse leakage from the the bearing.

2. Hydrodynamic slide bearing unit as claimed in claim 1, comprising sealing means arranged between the stationary (19) and mobile (20) parts of the bearing unit and coacting with the pressure-relieved portions (17, 18) of the bearing surfaces, said sealing means (30) preventing the lubricant from penetrating out of the bearing unit.

3. Hydrodynamic slide bearing unit as claimed in claim 2, wherein the bearing unit comprises a radial bearing, the relief openings (14, 15) extend along part of the periphery of a cylinder surface, coaxial with the axis of rotation, and the sealing means (30) comprises sealing rings arranged outside each relief opening.

4. Hydrodynamic slide bearing unit as claimed in claim 3, for rotary bearing of a shaft or journal (21) relative to a bearing seat, comprising
 an outer annular housing (19) adapted to be mounted in a bearing seat and having a first, inwardly turned circular-cylindrical bearing race (23),
 an annular shaft sleeve (20) to receive the shaft or journal (21) and with an outwardly turned circular-cylindrical second race adapted to coact with the first race (23) as a hydrodynamic bearing during the relative rotation of the races,
 annular sealing elements (30) arranged at both ends of the hydrodynamic bearing for rotary sealing between the outer housing (19) and the inner shaft sleeve (20), and
 a closed annular oil compartment (28) connected (35) with the spaces immediately inside the sealing elements.

5. Hydrodynamic slide bearing unit as claimed in claim 4, comprising at least one communication between the oil compartment (28) and a feed opening (13) arranged in the stationary race on the unloaded side of the hydrodynamic bearing.

6. Hydrodynamic slide bearing unit as claimed in claim 5, wherein the pressure relief openings (14, 15) comprise pressure relief grooves (14, 15) situated at some distance inside the sealing elements (30) in the stationary race (23) on the loaded side of the race, preferably with an angle between 90° and 180° along the circumference of the race, said grooves (14, 15) being conncected with the oil compartment (28).

7. Hydrodynamic slide bearing unit as claimed in claim 6, comprising an opening (13) situated diametrically opposite the pressure relief grooves (14, 15) for supply of oil from the oil compartment (28) to the lubricant layer.

8. Hydrodynamic slide bearing unit as claimed in claim 4, wherein the oil compartment (28) is arranged in the outer housing (29) and defined by two concentric tubes (24, 27) and two annular plane side discs (25, 26) which have communication channels (35) with a chamber between the side discs and sealing rings (30) arranged outside said discs and lying in sealng contact with the inner shaft sleeve (20) shaped as a tube.

9. Hydrodynamic slide bearing unit as claimed in claim 1, wherein the bearing is an axial bearing including two surfaces which are relatively moveable in a plane perpendicular, to the axis of rotation and have at least two lubricant sections which have their thickness converging in the direction of movement and thus at least two bearing pressure zones (39, 39') being part of an annular, plane race, the feed openings (37, 37') have a radial extent, while the relief openings (41, 42, 41', 42') are arranged substantially as part of a circular path respectively outside and inside the pressure zones (39, 39'), and the sealing means (43, 44) comprises annular, cylindrical axial seals arranged at the annular pressure-relieved bearing parts respectively outside (43) and inside (44) the relief openings (39, 39').

10. Hydrodynamic slide bearing unit as claimed in claim 9, comprising sealing means arranged between the stationary (19) and mobile (20) parts of the bearing units and coacting with the pressure-relieved portions (17, 18) of the bearing surfaces, said sealing means (30) preventing the lubricant from penetrating out of the bearing unit.

11. A hydrodynamic slide bearing unit, comprising,
 two members having surfaces which have a lubricant layer therebetween, one of said members being movable relative to the other member in a given direction of movement, said lubricant layer providing a load-bearing pressure zone disposed between the members,
 a feed opening means in one of said members for introducing lubricant between said members at a location which is upstream of the pressure zone,
 pressure relief opening means in one of said members for receiving lubricant from said pressure zone,
 a return passage means extending from said pressure relief opening means to said feed opening means, said return passage means being operable to carry lubricant from said pressure relief opening means to the feed opening means due to a pressure differential which exists between the pressure relief opening means and the feed opening means during relative movement of the members,
 said pressure relief opening means being a pair of openings which are elongated and orientated so that their dimensions in the direction of movement are substantially greater than their dimensions which are transverse to said direction of movement and are disposed on opposited sides of the pressure zone, said pressure relief opening means being operable to prevent loss of lubricant in a direction which is transverse to the direction of movement and to provide a supply of lubricant to the feed opening means.

12. A hydrodynamic slide bearing unit according to claim 11 wherein the return passage means has a dimension, measured transversely to the direction of movement, which is at least as great as the distance between the elongated pressure relief openings.

13. Hydrodynamic slide bearing unit having two relatively movable surfaces between which there is built up in a lubricant layer, at least one load-bearing pressure zone within which the pressure during one revolution in the direction of movement will increase from an initial pressure at the frontal portion of the pressure zone to a higher pressure around the most central part of the pressure zone and decrease again to the initial pressure, said slide bearing having at least one feed opening for lubricant at or ahead of that portion of the pressure zone which is foremost in the direction of movement of flow, an outtake means for collection of lubricant at a pressure higher than the initial pressure, said lubricant being fed back via a return means to the lubricant layer through a feed opening, whereby the pressure difference will produce a pump effect for circulation of lubricant through the lubricant layer, wherein the outtake means comprises elongated and orientated so that their dimensions in the direction of movement are substantially greater than their dimensions which are transverse to the direction of movement and are pressure relief openings situated downstream of the feed opening in order to relieve those portions of the bearing surfaces which are situated outside the relief openings from the higher pressure prevailing in the hydrodynamic bearing and eliminate the leakage flow perpendicular to the flow direction and return it to the feed opening, sealing means arranged between the stationary and mobile parts of the bearing unit and coacing with the pressure-relieved portions of the bearing surfaces, said sealing means preventing the lubricant from penetrating out of the bearing unit.

14. Hydrodynamic slide bearing unit as caimed in claim 13, for rotary bearing of a shaft or journal relative to a bearing seat, comprising an outer annular housing adapted to be mounted in a bearing seat and having a first, inwardly turned circular-cylindrical bearing race, an annualr shaft sleeve to receive the shaft or journal and with an outwardly turned circular-cylindrical second race adapted to coact with the first race as a hydrodynamic bearing during the relative rotation of the races, annular sealing elements arranged by both ends of the hydrodynamic bearing for rotary sealing between the outer housing and the inner shaft sleeve, and a closed annular oil compartment connected with the spaces immediately inside the sealing elements.

15. Hydrodynamic slide bearing unit as claimed in claim 14, comprising at least one communication between the oil compartment and a feed opening arranged in the stationary race on the unloaded side of the hydrodynamic bearing.

16. Hydrodynamic slide bearing unit as ciaimed in claim 15, wherein the pressure relief openings comprise pressure relief grooves situated at some distance inside the sealing elements in the stationary race on the loaded side of the race, preferably with an angle between 90° and 180° along the circumference of the race, said grooves being connected with the oil compartment.

17. Hydrodynamic slide bearing unit as claimed in claim 16, comprising an opening situated diametrically opposite the pressure relief grooves for supply of oil from the oil compartment to the lubricant layer.

18. Hydrodynamic slide bearing unit as claimed in claim 14, wherein the oil compartment is arranged in the outer housing and defined by two concentric tubes and two annular plane side discs which have communication channels with a chamber between the side discs and sealing rings arranged outside said discs and lying in sealing contact with the inner shaft sleeve shaped as a tube.

* * * * *